United States Patent [19]
Giacona, III

[11] Patent Number: 6,029,870
[45] Date of Patent: Feb. 29, 2000

[54] BOTTLED DRINK CARRIER APPARATUS

[75] Inventor: Corrado Giacona, III, New Orleans, La.

[73] Assignee: Giacona Container Company, Jefferson, La.

[21] Appl. No.: 09/138,267

[22] Filed: Aug. 21, 1998

[51] Int. Cl.[7] .................................................. A45C 5/00
[52] U.S. Cl. ................... 224/148.6; 24/3.13; 24/136 R; 224/258; 224/675
[58] Field of Search ............................. 224/148.5, 148.6, 224/250, 257, 258, 103, 921, 272, 674, 675; 24/136 R, 3.13

[56] References Cited

U.S. PATENT DOCUMENTS

| | | |
|---|---|---|
| D. 284,421 | 7/1986 | Siris . |
| D. 304,890 | 12/1989 | Canaan . |
| D. 315,477 | 3/1991 | Shearer . |
| D. 373,677 | 9/1996 | Kelly . |
| 1,637,003 | 7/1927 | Lang ........................................ 224/258 |
| 2,543,313 | 2/1951 | Dietzgen ................................. 224/272 |
| 2,793,901 | 5/1957 | Johnson . |
| 3,096,010 | 7/1963 | Rasmussen .............................. 224/250 |
| 4,248,366 | 2/1981 | Christiansen . |
| 5,148,926 | 9/1992 | Cocuzzo et al. . |
| 5,263,618 | 11/1993 | Talavera ................................. 224/148.5 |
| 5,427,259 | 6/1995 | Krastanov . |
| 5,454,497 | 10/1995 | Kettelson . |
| 5,497,818 | 3/1996 | Marcarelli ............................... 224/675 |
| 5,577,647 | 11/1996 | Pittarelli et al. . |

Primary Examiner—Stephen P. Garbe
Attorney, Agent, or Firm—Garvey, Smith, Nehrbass & Doody, L.L.C.

[57] ABSTRACT

A bottled drink carrier apparatus is provided for supporting a bottle containing a drink product at a position next a user's torso. The apparatus includes a strap assembly having upper and lower end portions, and a cable having ends that are attached to the lower portion of the strap assembly so that the cable forms a closed noose. The upper end of the strap assembly has a hanger for forming a connection with the user's clothing (for example belt, belt loop, etc.) at the torso area. A slide is provided for tightening the noose about a bottle to be supported, the slide frictionally engaging the cable at least in a locking position. A detachable connection can be provided for enabling the user to separate the bottle and noose from the remainder of the assembly such as when the user wants to consume the drink product. This detachable connection is preferably a detachable quick release buckle type arrangement that enables the user to quickly disconnect the bottle and the noose from the remainder of the assembly.

25 Claims, 2 Drawing Sheets

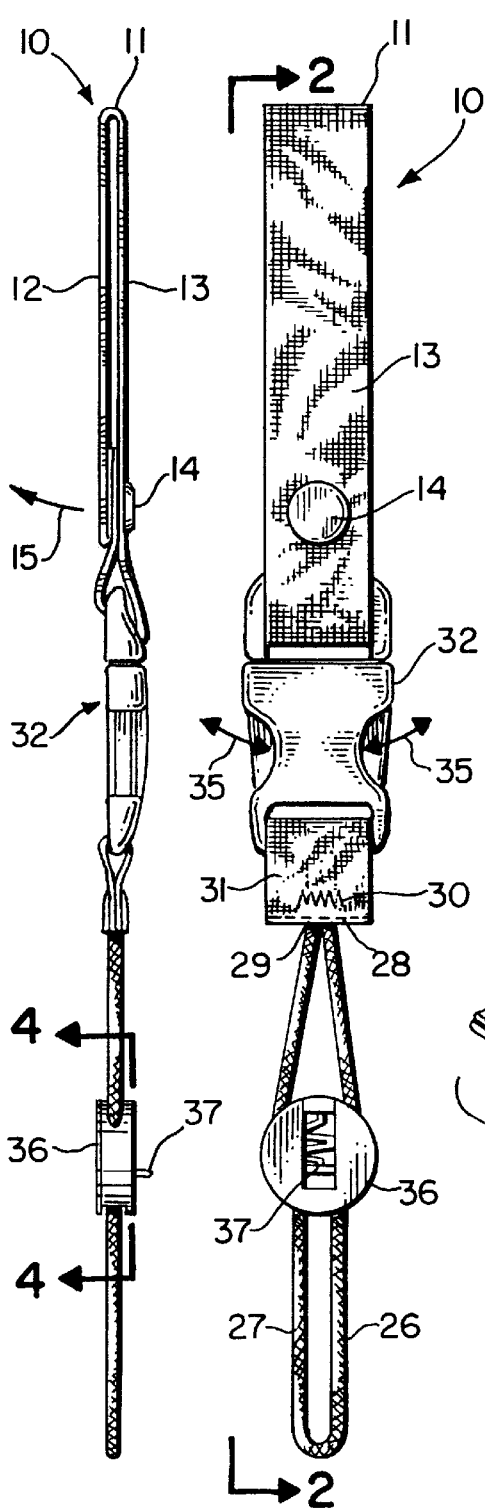
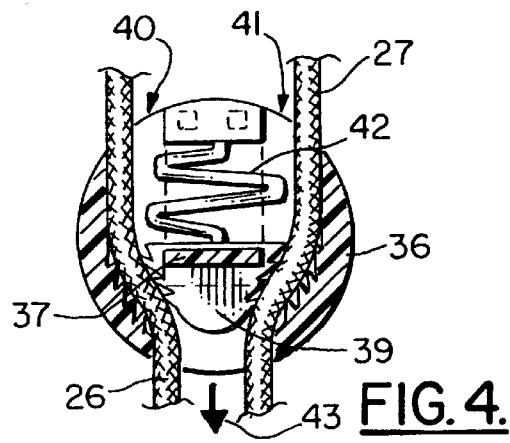
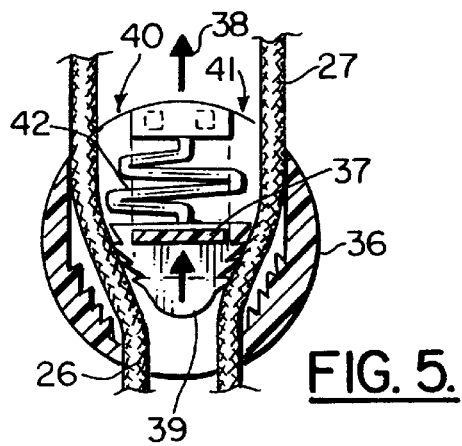
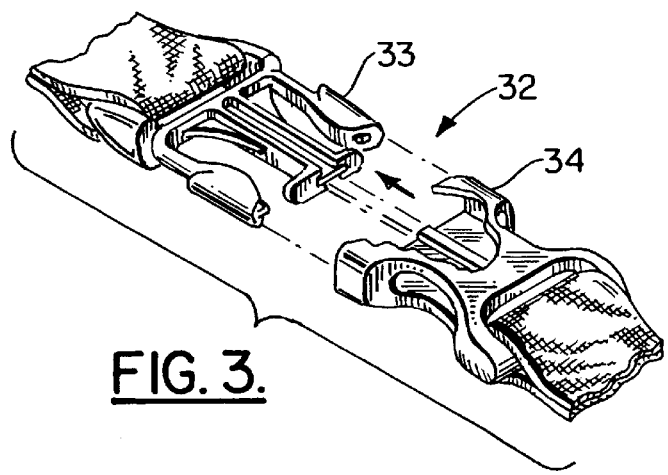

BOTTLED DRINK CARRIER APPARATUS

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to devices for supporting a bottled drink in close proximity to a user. Even more particularly, the present invention relates to a bottled drink carrier apparatus wherein the carrier can be affixed to a user's torso area (for example belt, belt loop, clothing article, etc.) and wherein a detachable connection enables the bottle and a small cable portion of the apparatus to be disconnected from the user or support so that the drink can be consumed and wherein the bottle and cable can be reconnected to a strap portion of the apparatus in between said consumptions.

2. General Background of the Invention

Most beverages are sold today in disposable containers that are made of plastic to be recycled after use. These bottled drink products are used for a number of different products such as soft drinks, spring water, colas, lemonade, sport drinks and the like. A number of similarly configured bottles are manufactured of glass.

During outdoor festivals, concerts, gatherings and the like, individuals typically carry such bottled drink products with them, thus requiring continuous use of one hand. In the past, there have been sold bottled drink carriers for holding such drink products so that the user can have full use of both hands. One such prior art device is in the form of an elongated strap having a foam insulated sleeve at the lower end of the strap with a cylindrical shaped recess for carrying a drink bottle or can.

One of the problems of prior art type bottled drink carriers is that they are cumbersome to use and operate.

The following U.S. Patents are incorporated herein by reference:

2,793,901; 4,248,366; 5,148,926; 5,427,259; 5,454,497; 5,577,647; D284,421; D304,890; D315,477; and D373,677.

BRIEF SUMMARY OF THE INVENTION

The present invention provides an improved bottled drink carrier apparatus that may easily be carried by the user at the torso area, such as for example, by attachment to a user's belt, belt loop, or other part of a user's clothing to which a loop member can be attached, or may be attached to a baby stroller or other support to which a loop member can be attached. The apparatus includes a strap assembly having an upper end and a lower end.

A detachable connector is provided for connecting the upper end of the strap member to the loop member. The strap member includes a cable portion having first and second ends, each end being connected to the lower end of the strap member.

A slide is provided having apertures through which the cable can extend. The combination of the slide and cable define an adjustable noose formed by the cable below the slide during use. This adjustable noose is like an "adjustable O-ring", in that it can be made of a relatively small diameter cable and can be adjusted in size to fit various size bottles.

Sliding movement of the slide upon the cable changes the size of the noose so that the noose can grip the neck area of a bottled drink despite the diameter of the bottle at the neck area.

The slide has a catch that is moveable between "release" and "gripping" positions, the slide gripping the cable in the gripping position. In order to adjust the noose, the slide is moved upon the cable when the slide is in the "release" position, until a desired noose size is obtained.

The cable is preferably much smaller in diameter than the maximum width of the strap so that the cable can be made very small and lightweight. This provides two functional advantages. The cable can fit very small recesses that are often provided on drink products at the neck area. Also, because the strap is very light weight, it minimally inconveniences the user when the cable portion of the device is disconnected from the remainder of the apparatus such as when the user wants to drink the drink from the bottle.

A detachable connection is preferably in the form of a buckle that enables a user to disconnect the noose and bottle from the remainder of the strap. The user can then drink from the bottle while the loop member remains affixed to the user's torso and the noose is connected to the bottle.

The cable is preferably between about 3 and 12 inches in length and has a thickness of between about $\frac{1}{16}$ and $\frac{1}{4}$ inches. The strap has a maximum thickness of about $\frac{1}{2}$–2 inches. This enables the cable to be doubled upon itself with its free ends being stitched to the remainder of the apparatus. In such a situation, the loop is of a diameter of about 1 to 6 inches which is adequate to affix the noose to most drink products at the neck area of the bottle and still provide adjustability with the slide.

The webbing of the large loop member is preferably $\frac{1}{4}$"–3" wide, more preferably $\frac{1}{4}$"–2" wide, and most preferably $\frac{1}{4}$"–1.5" wide. It can be, for example, 1" wide. This is a good width to allow information or designs to be printed on the webbing, without being so wide as to be cumbersome or uncomfortable. The webbing allows art work or advertising to be easily displayed on the present invention.

The webbing can advantageously be printed with supplemation printing or photographic printing.

The webbing of the loop member is preferably 2.5"–40" long. More preferably, the webbing is 4" to 20" long. The webbing can be, for example, about 12" long.

The webbing can be made of any suitable material, and preferably one which is strong and durable. The webbing is preferably made of unstarched polyester (polyester without sizing), such as that which is commercially available from Tape Craft.

The cord (cable) is 3"–60" long, and preferably 6"–45" long. It can be, for example, 15" long.

The noose can have a maximum diameter of 1"–24", preferably 1"–18", and more preferably 1"–12". A typical maximum diameter of the noose is 4".

The cord can be made of any suitable material. It can be, for example, polyethylene, such as the braided polyethylene cord commercially available from Franklin Braid of Emporia, Va.

The strap is preferably stitched to the cord with bar tack stitching. This stitching is a zig-zag stitching which secures the strap and the cord together well.

The slide can be any suitable cord slide. A preferred cord slide is a Duraflex brand lock made by National Molding in N.Y.

The opening is like an adjustable O-ring. It can be tightened around bottle necks as well as other items, such as sunglasses and promotional drink items. The small diameter cable can thus "double" as a carrier of other objects than bottles, such as sunglasses, cosmetic products, sunscreen containers, suntan oil containers, food containers and the like.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a front elevational view of the preferred embodiment of the apparatus of the present invention;

FIG. 2 is a side view taken along lines 2—2 of FIG. 1;

FIG. 3 is a partial perspective view of the preferred embodiment of the apparatus of the present invention;

FIG. 4 is a front cutaway view of slide portion that can be used as part of the apparatus of the present invention showing the slide in a closed or gripping position;

FIG. 5 is a front cutaway view of slide portion that can be used as part of the apparatus of the present invention showing the slide in a open or released position;

DETAILED DESCRIPTION OF THE INVENTION

Figure 6:
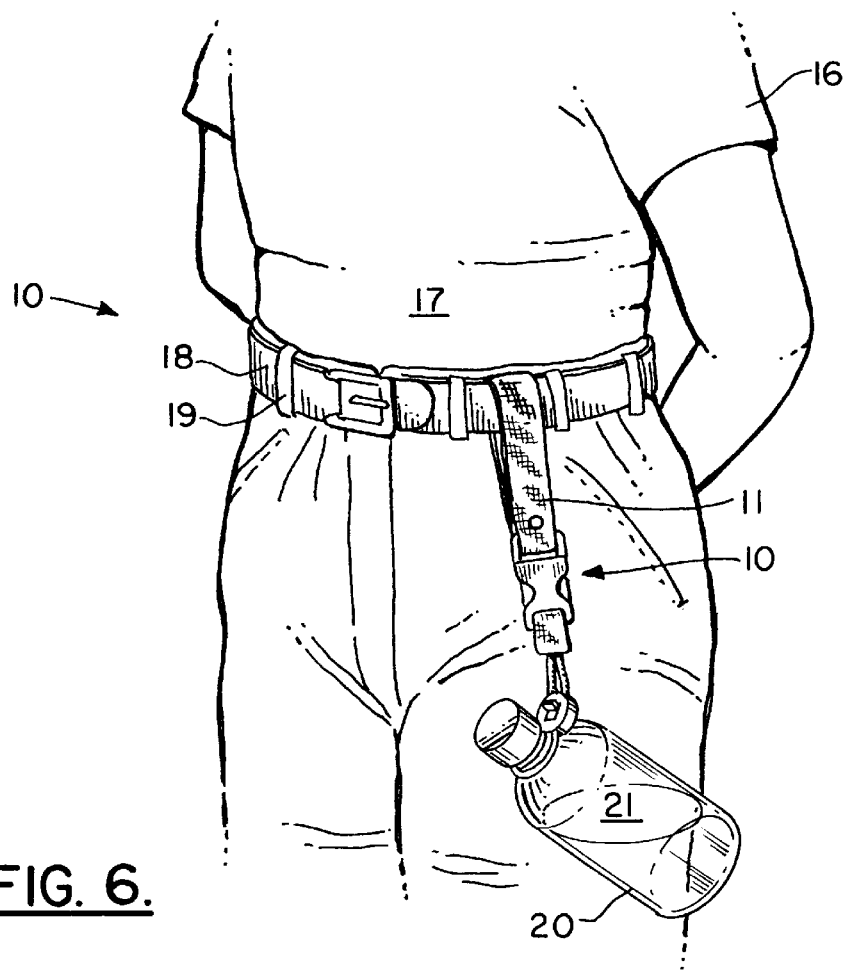
FIG. 6 is a perspective view of the preferred embodiment of the apparatus of the present invention showing it during use attached to a user's torso area at a user's belt.

FIGS. 1, 2 and 6 show generally the preferred embodiment of the apparatus of the present invention designated generally by the numeral 10. Bottled drink carrier apparatus 10 can be attached to the torso area 17 of a user 16 with a large loop member 11 as shown in FIGS. 1, 2 and 6. The large loop member 11 can be attached to the user's belt 18, belt loop 19 or other available portion of the user's clothing at the torso 19 area. The large loop member 11 includes a rear band 12 and front band 13 that are attached together with a detachable grip 14, such as a snap fastener, though other detachable grip means, such as Velcro brand hook-and-loop fasteners, could be used to allow large loop member 11 to be opened. As shown in FIG. 2, the rear band 12 can be separated from the front band 13 by detaching the lower end of the rear band 12 at the grip 14 by pulling the bottom of the rear band 12 in the direction of arrow 15 in FIG. 2. Each of the bands 12, 13 can be advantageously be webbing (web fabric), plastic, rubber or leather material between about one half and two and one half inches in maximum width.

Figure 7:
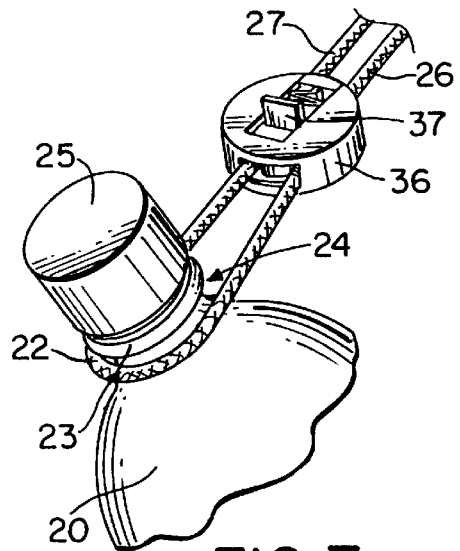
FIG. 7 is a fragmentary perspective view of the preferred embodiment of the apparatus of the present invention showing the noose in an open position, and prior to tightening of the noose about the neck area of a bottle.
Figure 8:
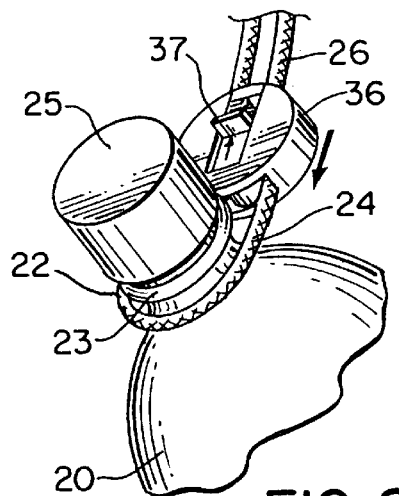
FIG. 8 is a partial perspective fragmentary view of the preferred embodiment of the apparatus of the present invention showing the noose in an enclosed tightened position about the neck area of the bottle.

The apparatus 10 of the present invention enables the user 16 to support a bottle 20 containing a drink product 21 (see FIG. 6) by securing the bottle neck 22 with an adjustable noose 26 as will be described more fully hereinafter. Some bottle neck portions 22 typically provide a recess or groove 24 that can for example be defined by the bottle top 25 and an annular flange 23, both being positioned at the neck area 22. In FIGS. 7 and 8, the noose 26 is shown as being comprised of a relatively small diameter cable 27 having end portions 28, 29 that are attached by stitching at 30 (see FIG. 1) for example to strap 31. This cable 27 is preferably of a much smaller diameter than the maximum thickness of large loop member 11 and strap 31. The cable 27 has a thickness of between about 1/32 inch and 1/4 inch. The loop 11 and strap 31 have widths of between about 1/2 inch and 2 1/2 inches.

A detachable connection is preferably formed between the lower end of large loop member 11 and the upper end of strap 31. The detachable connection is preferably in the form of a buckle assembly 32 as shown in FIGS. 1–3. Such a buckle assembly 32 is a commercially available item, being comprised of male and female sections 33, 34 (see FIG. 3). The buckle sections 33, 34 can be separated by depressing portions of the male section of the buckle 32 as shown by arrows 35 in FIG. 1. The buckle assembly 32 can be attached to large loop member 11 by stitching or by riveting, such as for example by using a portion of grip 14 to connect the buckle assemble 33 to the large loop member 11.

In order to change the size of noose 26, a slide 36 is provided. The slide 36 provides a trigger 37 that can be operated with a user's thumb. In order to release the slide so that it can adjust the size of the noose 26, the trigger 37 is moved in the direction of arrow 38 as shown in FIG. 5. This movement also releases the locking member 39 (FIG. 4) so that the cable 27 can slide through opposed passageways 40, 41. In order to lock the slide 36 to the cable 27 thus defining the size of the noose 26, the user simply releases the trigger 37. This enables return spring 42 to move the locking member 39 to the gripping position of FIG. 4 as shown by arrow 43.

The following table lists the parts numbers and parts descriptions as used herein and in the drawings attached hereto.

| PARTS LIST | |
|---|---|
| Part Number | Description |
| 10 | bottled drink carrier |
| 11 | large loop member |
| 12 | rear band |
| 13 | front band |
| 14 | detachable grip |
| 15 | arrow |
| 16 | user |
| 17 | user's torso |
| 18 | belt |
| 19 | belt loop |
| 20 | bottle |
| 21 | drink product |
| 22 | bottle neck |
| 23 | annular flange |
| 24 | recess |
| 25 | bottle top |
| 26 | noose |
| 27 | cable |
| 28 | cable end |
| 29 | cable end |
| 30 | stitching |
| 31 | strap |
| 32 | buckle assembly |
| 33 | male buckle section |

-continued

PARTS LIST

| Part Number | Description |
|---|---|
| 34 | female buckle section |
| 35 | arrow |
| 36 | slide |
| 37 | trigger |
| 38 | arrow |
| 39 | locking member |
| 40 | passageway |
| 41 | passageway |
| 42 | spring |
| 43 | arrow |

The foregoing embodiments are presented by way of example only; the scope of the present invention is to be limited only by the following claims.

I claim:

1. A bottled drink carrier apparatus comprising:
   a) a loop member for enabling an attachment to a user's belt;
   b) a strap member having an upper end and a lower end;
   c) a detachable connector for connecting the upper end of the strap member to the loop member;
   d) a cable having first and second ends, each end connected to the lower end of the strap member;
   e) a slide having spaced-apart apertures through which the cable can extend;
   f) an adjustable noose formed by the cable below the slide during use;
   g) wherein sliding movement of the slide upon the cable changes the size of the noose so that the noose can grip a bottled drink selected by a user; and
   h) the slide having a catch that is movable between "release" and "gripping" positions, the slide gripping the cable in the gripping position the slide sliding upon the cable in the release position.

2. The bottled drink carrier of claim 1 wherein the cable has a diameter of between about 1/32" and 1/2".

3. The bottled drink carrier of claim 1 wherein the cable has a diameter of about 1/8".

4. The bottled drink carrier of claim 1 wherein the detachable connector has first and second interlocking members that enable a user to quickly disconnect the noose and bottle so that the user can drink from the bottle when the loop member remains affixed to the user's belt and the noose is connected to the bottle.

5. The bottled drink carrier of claim 4 wherein the detachable connector includes a part on the strap member.

6. The bottled drink carrier of claim 4 wherein the cable has a cable thickness and the loop member has a maximum width, the maximum width being greater than the cable thickness.

7. The bottled drink carrier of claim 4 wherein the cable has a cable thickness and the strap member has a maximum width, the maximum width being much greater than the cable thickness.

8. The bottled drink carrier of claim 4 wherein the detachable connection includes a buckle.

9. The bottled drink carrier of claim 1 wherein the cable is between about 3 and 60 inches long.

10. A bottled drink carrier apparatus for supporting a bottle containing a drink product at a position next to a user's torso, comprising a) an assembly having separate upper loop and lower strap sections, said sections including;
   b) a detachable connector for removably connecting the upper loop and lower strap sections;
   c) a cable having ends attached to the lower strap section so that the cable forms a closed noose;
   d) the upper loop section having a hanger for forming a connection with the user's clothing at the torso area; and
   e) a slide for tightening the noose about a bottle to be supported, the slide frictionally engaging the cable in a locking position.

11. A bottled drink carrier apparatus comprising:
   a) a harness that includes a loop member for enabling an attachment to a user's torso area at an article of clothing worn by the user, the harness including a strap member having an upper end and a lower end;
   b) a detachable connector for connecting the upper end of the strap member to the loop member;
   c) a cable having first and second ends, each end connected to the lower end of the strap member;
   d) a slide through which the cable can extend; and
   e) an adjustable noose formed by the cable below the slide during use, wherein sliding movement of the slide upon the cable changes the size of the noose so that the noose can be constricted to grip a bottled drink selected by a user.

12. The bottled drink carrier of claim 11 wherein the cable has a diameter of between about 1/32 and 1/4 inch.

13. The bottled drink carrier of claim 11 wherein the cable has a diameter of less than 1/4 inch.

14. The bottled drink carrier of claim 11 wherein the detachable connection on the harness has first and second interlocking members that enable a user to quickly disconnect the noose and bottle so that the user can drink from the bottle when the loop member remains affixed to the user's torso area and the noose is connected to the bottle.

15. The bottled drink carrier of claim 14 wherein the detachable connection is part of the strap member.

16. The bottled drink carrier of claim 11 wherein the slide has a catch that is moveable between "release" and "gripping" positions, the slide gripping the cable in the gripping position, the slide sliding upon the cable in the release position.

17. The bottled drink carrier of claim 14 wherein the cable has a cable thickness and the loop member has a maximum width, the maximum width being greater than the cable thickness.

18. The bottled drink carrier of claim 14 wherein the cable has a cable thickness and the strap member has a maximum width, the maximum width being much greater than the cable thickness.

19. The bottled drink carrier of claim 14 wherein the detachable connection includes a quick release buckle having said first and second interlocking members.

20. The bottled drink carrier of claim 1 wherein the cable is between about 3 and 60 inches long.

21. A bottled drink carrier apparatus for supporting a bottle containing a drink product at a position next to a user's torso, comprising
   a) an assembly having upper loop and lower strap sections, the upper loop section having a hanger for forming a connection with the user's clothing at the torso area;
   b) a detachable connector for removably connecting the upper loop and lower strap sections;

c) a cable having ends attached to the lower strap section so that the cable forms a closed noose; and d) a slide for tightening the noose about a bottle to be supported, the slide frictionally engaging the cable in a locking position.

22. The bottled drink carrier of claim 10 wherein the upper loop section is longer than the lower strap section.

23. The bottled drink carrier of claim 21 wherein the upper loop section is longer than the lower strap section.

24. The bottled drink carrier of claim 21 wherein the cable has a diameter of between about 1/32" and 1/2".

25. The bottled drink carrier of claim 21 wherein the cable has a cable thickness and the loop member has a maximum width, the maximum width being greater than the cable thickness.

* * * * *